United States Patent [19]

Kobayashi et al.

[11] Patent Number: 4,661,896

[45] Date of Patent: Apr. 28, 1987

[54] HIGH VOLTAGE POWER SUPPLY SYSTEM INCLUDING INVERTER CONTROLLER

[75] Inventors: Hiroyoshi Kobayashi; Kenji Honda, both of Ootawara, Japan

[73] Assignee: Kabushiki Kaisha Toshiba, Kawasaki, Japan

[21] Appl. No.: 879,963

[22] Filed: Jun. 30, 1986

[30] Foreign Application Priority Data

Jul. 4, 1985 [JP] Japan ................................ 60-147173

[51] Int. Cl.[4] ............................................ H02M 3/335

[52] U.S. Cl. ........................................ 363/24; 363/28; 363/95; 363/124; 323/266; 378/101

[58] Field of Search .................................... 363/24–28, 363/95–97, 124, 133–134, 139; 323/266; 378/101, 103, 104

[56] References Cited

U.S. PATENT DOCUMENTS 3,818,306 6/1974 Marini ............................. 323/266 X
4,161,773 7/1979 Szpakowski .................... 363/139 X
4,221,968 9/1980 Franke ............................ 378/101 X
4,251,857 2/1981 Shelly ............................. 363/124 X

*Primary Examiner*—Peter S. Wong
*Attorney, Agent, or Firm*—Finnegan, Henderson, Farabow, Garrett & Dunner

[57] ABSTRACT

A high voltage power supply system includes a DC-to-DC converter for producing a DC low voltage, a DC-to-AC inverter connected to a step-up transformer for producing an AC high voltage by transforming an AC low voltage obtained from the DC low voltage, and an inverter controller for controlling an operation time period of the DC-to-AC inverter longer than that of the DC-to-DC converter. Since a residual charge stored in a capacitor of the DC-to-DC converter is rapidly discharged by lengthening the operation time period of the DC-to-AC inverter, an unwanted AC high voltage is induced at a secondary winding of the step-up transformer.

8 Claims, 12 Drawing Figures

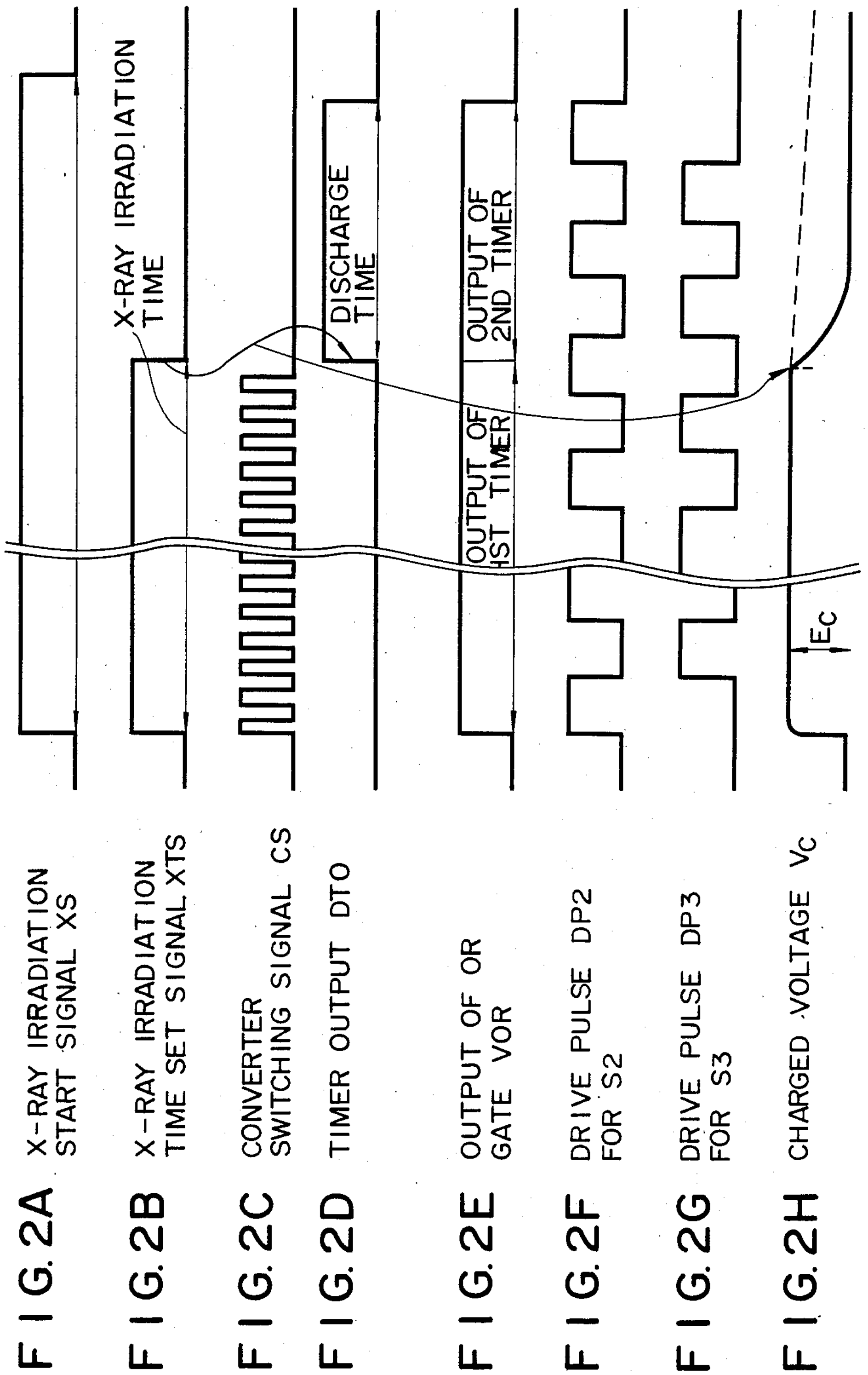
FIG. 2A X-RAY IRRADIATION START SIGNAL XS
FIG. 2B X-RAY IRRADIATION TIME SET SIGNAL XTS
FIG. 2C CONVERTER SWITCHING SIGNAL CS
FIG. 2D TIMER OUTPUT DTO
FIG. 2E OUTPUT OF OR GATE VOR
FIG. 2F DRIVE PULSE DP2 FOR S2
FIG. 2G DRIVE PULSE DP3 FOR S3
FIG. 2H CHARGED VOLTAGE VC
X-RAY IRRADIATION TIME
DISCHARGE TIME
OUTPUT OF 1ST TIMER
OUTPUT OF 2ND TIMER
EC

HIGH VOLTAGE POWER SUPPLY SYSTEM INCLUDING INVERTER CONTROLLER

BACKGROUND OF THE INVENTION

1. Field of the Invention

The present invention relates to a high voltage power supply system capable of producing a stable, high voltage suitable for an X-ray tube and further producing a predetermined X-ray dose within a short repetition period.

2. DESCRIPTION OF THE PRIOR ART

A high voltage to be applied to an X-ray tube (to be referred to as "a tube voltage" hereinafter) must be stable and maintained at set values (e.g., an exposure time) during X-ray irradiation in order to obtain better image quality.

For this purpose, using high power semiconductors, DC-to-DC converter and DC-to-AC inverter techniques have recently been applied to the X-ray power supply control field.

Typically, a conventional high voltage power supply system including a DC-to-DC converter and a DC-to-AC inverter has the following arrangement.

The DC-to-DC converter is connected to a DC low voltage power source of, e.g., 300 V. The DC-to-DC converter includes a switching transistor, which switches this DC low voltage input at a predetermined switching frequency (e.g., about 10 kHz). The switching frequency is controlled by a switching control signal applied to the base of the switching transistor.

The DC-to-DC converter supplies an interrupted DC current (pulse current) at a low voltage to a DC-to-AC inverter provided at the following stage as an input DC voltage. The DC-to-AC inverter includes two transistors which, for example, are push-pull connected to each other. The primary winding of a transformer for generating an extra high voltage is connected to these transistors as collector loads. Complementary switching control signals, which are phase-controlled not to be ON at the same instant, are respectively applied to the bases of these transistors.

As a result, the push-pull connected transistors alternately repeat ON states, and an induced high voltage (e.g., 10 kV to 50 kV) is produced from the secondary winding of the transformer. The high voltage is produced at a predetermined radio frequency, which is determined by the switching frequency of the transistors of the DC-to-AC inverter.

As is well known, there are two types of X-ray irradiation operations. That is, the X-ray irradiation is repeated for a short cycle (e.g., an X-ray CT), and it is performed only once with a long period, on the order of milliseconds (e.g., a normal X-ray fluoroscopy).

The drawbacks of a conventional system according to the X-ray fluoroscopy will now be briefly outlined.

Normally, in a DC-to-DC converter of the above-mentioned type, a charging capacitor is connected to the load side of the collector, and a discharging resistor is connected in parallel with the capacitor. The capacitor and the resistor constitute a smoothing, or filtering circuit of the DC-to-DC converter. As is well known, the duty ratio of a switched DC voltage can be changed under the control of the switching control signal supplied to the base of the switching transistor of the DC-to-DC converter. Therefore, the DC output voltage of the DC-to-DC converter can be changed, depending upon the duty ratio.

X-ray generation is stopped immediately after a set irradiation time has elapsed. This can be achieved by immediately stopping the application of the driver voltage to the switching transistors of the DC-to-DC converter and the DC-to-AC inverter. However, a residual charge remains in the capacitor of the filtering circuit, and the charge is gradually discharged by the resistor. In this case, the switching transistor is turned off (open circuited). The resistance of the resistor is normally set to be high (otherwise, the load side of the transistor is undesirably short-circuited), and the time constant of the circuit thereby becomes long, say from 1 to several seconds. As a result, even after the X-ray irradiation is stopped, a residual voltage due to a residual charge can remain in the circuit for such a relatively long period of time. Therefore, when the next X-ray irradiation starts while the residual charge still remains, a tube voltage higher than a desired value is accidentally generated. In the worst case, such an abnormally high voltage may exceed an allowable tube voltage of the X-ray tube. This may cause damage to or destruction of the X-ray tube. In addition, this may cause an X-ray dose during a succeeding X-ray irradiation to be higher than a desired value.

This adversely influences X-ray image quality and even may cause medical injury to the patient under examination.

The present invention has been made in consideration of the above situation, and has as its first object to provide an X-ray high voltage power supply system which can quickly discharge the output capacitor of the DC-to-DC converter after X-ray irradiation is completed.

A second object of the present invention is to provide a safe high voltage power supply system, which can obtain a better quality X-ray image and can apply a stable tube voltage of a desired value to an X-ray tube during successive X-ray irradiations, to prevent an excess tube voltage from being generated when an X-ray imaging operation is repeated within a relatively short cycle.

SUMMARY OF THE INVENTION

These objects of the invention can be accomplished by providing a high voltage power supply system comprising:

means for producing a command signal to determine a time period of X-ray irradiation;

a DC-to-DC converter circuit including first switching means for switching a DC (direct current) input voltage so as to produce a DC low output voltage in response to said command signal during only said time period of X-ray irradiation, and filtering means having at least a capacitive element for filtering said DC low output voltage to produce a filtered DC low output voltage;

a DC-to-AC inverter circuit including second switching means connected to said DC-to-DC converter circuit for switching said filtered DC low output voltage so as to produce an AC (alternating current) low voltage, and a step-up transformer having a primary winding and a secondary winding magnetically coupled to said primary winding, said primary winding being connected to said second switching means so as to receive said AC low voltage and said secondary winding including an AC high voltage for the X-ray irradiation by transforming said AC low voltage applied to said primary winding; and an inverter control circuit coupled to said second switching means of the DC-to-AC inverter circuit, for controlling, in response to said command signal, an operation time period of said DC-to-AC inverter circuit to be longer than said time period of X-ray radiation so as to discharge a residual charge stored in said capacitive element of said filtering means.

BRIEF DESCRIPTION OF THE DRAWINGS

These as well as other objects and advantages of this invention will be better appreciated upon reading the following detailed description of the presently preferred exemplary embodiments in conjunction with the accompanying drawings, in which

FIGS. 2A to 2H show waveforms of signals appearing in the circuit shown in FIG. 1;

DETAILED DESCRIPTION OF THE PREFERRED EMBODIMENTS BASIC IDEA OF THE INVENTION

Before proceeding with various preferred embodiments, a basic idea of the invention will now be summarized.

In a power supply system including a DC-to-DC converter and a DC-to-AC inverter for generating a high voltage suitable for an X-ray tube, a residual charge stored in the output capacitor of the DC-to-DC converter is compulsorily discharged. This residual charge causes an unwanted DC output voltage of the DC-to-DC converter to be produced after the X-ray irradiation on a patient has been terminated. To this end, the residual charge of the output capacitor is rapidly discharged by bringing only this DC-to-AC inverter into operation for a predetermined short time period after the X-ray irradiation has been completed.

ARRANGEMENT OF HV POWER SUPPLY SYSTEM

Figure 1:
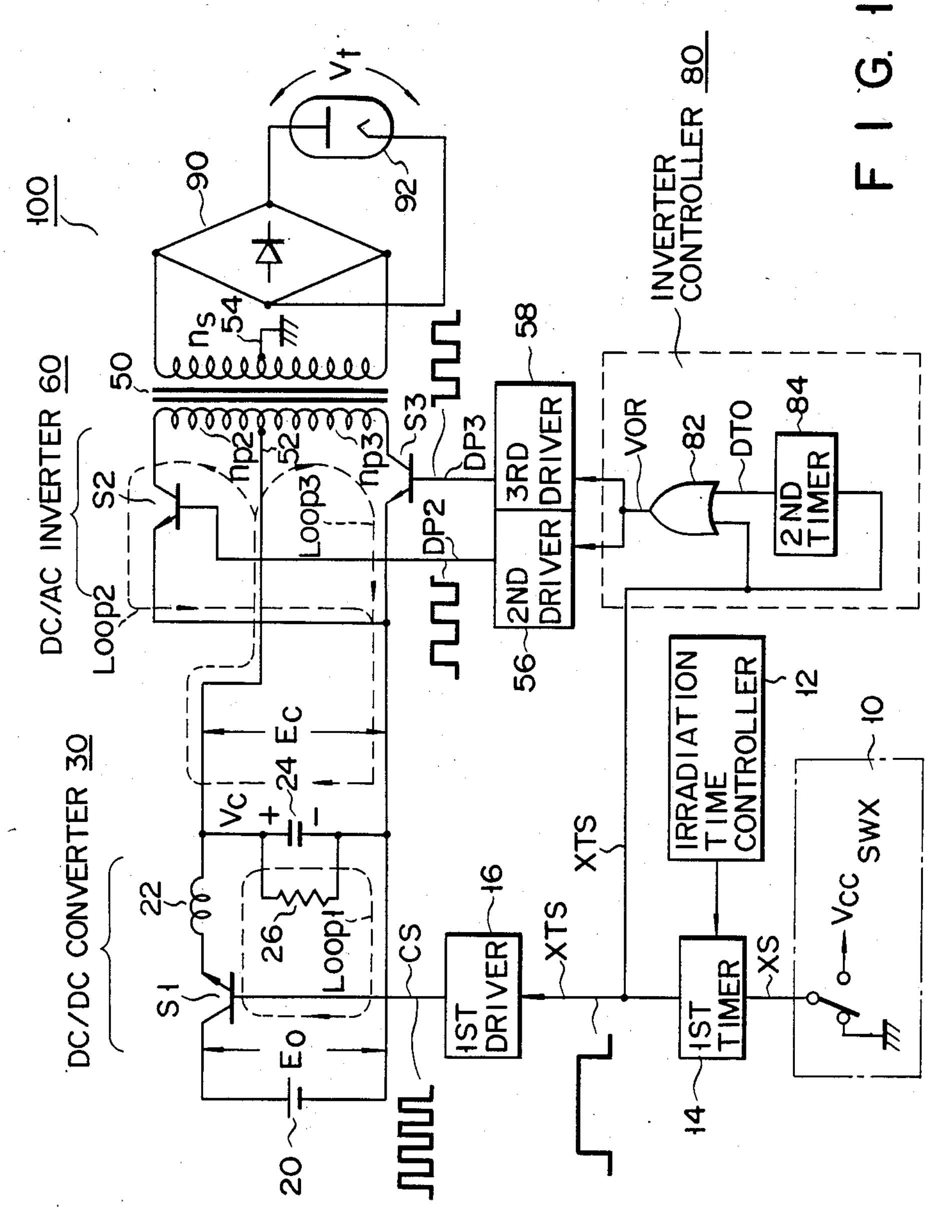
FIG. 1 is a schematic circuit diagram of a high voltage power supply system according to an embodiment of the invention.

Referring to FIG. 1, a description will be made of a high voltage power supply system 100 according to a preferred embodiment of the invention.

In the high voltage power supply system 100 shown in the circuit diagram of FIG. 1, reference numeral 10 denotes an X-ray irradiation starting switch; and 12 is an irradiation time controller for setting an X-ray irradiation time. Reference numeral 14 represents an irradiation time control timer (referred to as first timer hereinafter) in which the X-ray irradiation time is set by controller 12, and which generates an irradiation signal for a predetermined time in response to a signal from power supply line Vcc upon turning on of switch 10. Reference numeral 16 denotes a first driver which generates a drive signal of a predetermined pulse width while the irradiation signal is received from first timer 14.

Reference numeral 20 denotes a DC power source for generating output voltage $E_0$; and S1, an NPN switching transistor. Transistor S1 generates output voltage E0 from DC power source 20 at the output side thereof while the drive signal is received from driver 16, i.e., during its ON level interval. Reference numeral 22 denotes a coil connected in series with the positive side of the power supply line at the rear stage of transistor S1; 24, a charging capacitor connected between the power supply lines at the rear stage of transistor S1; and 26 a resistor, connected in parallel with capacitor 24, for discharging capacitor 24. These components constitute a smoothing circuit. DC-to-DC converter 30 is constituted by first driver 16, transistor S1, coil 22, resistor 26, and capacitor 24. As described previously, the output voltage from DC-to-DC converter 30 is determined by the pulse width of the drive signal from first driver 16. In other words, the duty ratio of the converter 30 is controlled. The output voltage from DC-to-DC converter 30, indicated by Ec, is a DC low voltage.

DC-to-AC inverter 60 is connected to the output side of DC-to-DC converter 30. DC-to-AC inverter 60 includes the following components.

High voltage step-up transformer 50 has primary windings up2 and up3, and secondary winding ns, and the primary and secondary windings respectively have center taps 52 and 54.

Reference numerals S2 and S3 denote NPN transistors for DC-to-AC inverter 60. Transistor S2 is connected between one end of primary winding np2 of transformer 50, viewed from center tap 52 and the negative output line of DC-to-DC converter 30, thereby turning the power supply output to winding np2 on and off. Transistor S3 is connected between one end of primary winding np3, viewed from tap 52 and the positive output line of DC-to-DC converter 30, thereby turning the power supply output to winding np3 on and off. Transistors S2 and S3 are connected to achieve a normal push-pull operation.

Reference numerals 56 and 58 denote second and third drivers for generating drive signals of predetermined pulse widths while the irradiation signal is received from timer 14 through a signal processing circuit (to be described later). Second driver 56 drives transistor S2 through its base, and third driver 58 drives transistor S3 through its base.

Inverter controller 80 is connected between second and third drivers 56 and 58 and first timer 14 for controlling an irradiation time. Controller 80 includes OR gate 82 and second timer 84. As will be described later, controller 80 eliminates residual voltage Ec due to a residual charge of DC-to-DC converter 30, i.e., the input voltage to DC-to-AC inverter 60.

Bridge-type voltage doubler full wave rectifier 90 is connected to secondary winding ns of transformer 50, thereby obtaining a tube voltage. The tube voltage is applied to the cathode and anode of X-ray tube 92 to generate predetermined X-rays.

OPERATIONS OF HV POWER SUPPLY SYSTEM

The operation of power supply system 100 shown in FIG. 1 will now be described with reference to the waveform chart of FIG. 2.

A desired X-ray irradiation time is determined by irradiation time controller 12 prior to the X-ray irradiation. The irradiation time set by controller 12 is set in first timer 14. When switch 10 is operated, X-ray irradiation starting signal XS is supplied to timer 14 (FIG. 2A), and first timer 14 generates X-ray irradiation time set signal XTS until the given irradiation time has passed (FIG. 2B). Signal XTS is supplied to first driver 16. In response to signal XTS, first driver 16 generates converter switching signal CS of a predetermined pulse width to the base of transistor S1. Transistor S1 transmits the output from power source 20 therethrough during the ON time of the pulse (i.e., upper level of FIG. 2C). More specifically, pulse-width controlled DC output Ec can be obtained. In this way, a DC voltage determined by the duty ratio which has a level corresponding to the switching pulse width and has been smoothed by the smoothing, or filtering circuit (24, 26) (i.e., charging voltage VC for capacitor 24, corresponding to Ec [see FIG. 2H]), is applied to primary windings np2 and np3 of transformer 50 through transistor S1.

Therefore, transistor S1 serves not only to control the tube voltage, but also as a main switch for turning X-ray irradiation on and off.

X-ray irradiation time set signal XTS generated from first timer 14 is supplied to second timer 84 and OR gate 82, as well as first driver 16. Therefore, drive signal VOR is supplied to second and third drivers 56 and 58 through OR gate 82, as shown in FIG. 2E, and second and third drivers 56 and 58 alternately generate complementary pulse signals DP2 and DP3 (FIGS. 2F and 2G) having predetermined pulse widths to alternately switch transistors S2 and S3. Thus, transistors S2 and S3 serve as an inverter.

INVERTER CONTROLLER 80

Upon receipt of signal XTS, second timer 84 performs given delay processing, and then generates timer output DTO, as shown in FIG. 2D. A time period during which timer output DTO is continuously generated defines a term sufficient for discharging a residual charge stored in output capacitor 24 of DC-to-DC converter 30. Accordingly, the end of the generation period of timer output signal DTO coincides with the end of output VOR from OR gate 82. In other words, the generation time periods of output signals DP2 and DP3 from drivers 56 and 58 are set to be longer than the duration time of output signal CS from driver 16. As a result, even after DC-to-DC converter 30 is stopped, DC-to-AC inverter 60 still continues its operation. This is for discharging the residual charge stored in the output capacitor 24.

DISCHARGING OF RESIDUAL CHARGE

A novel way for rapidly discharging such a residual charge as the main feature of the present invention will now be described. Timer output signal DTO of second timer 84 and X-ray irradiation time set signal XTS are supplied, as drive signals VOR, to second and third drivers 56 and 58 through OR gate 82 (see FIG. 2E). After signal XTS is disabled (OFF), second and third drivers 56 and 58 alternately generate pulse signals for a time period necessary for discharging residual voltage Ec stored in capacitor 24 of DC-to-DC converter 30, as shown in FIGS. 2F and 2G. Accordingly, transistors S2 and S3 are alternately switched to serve as an inverter. Thus, the residual charge stored in capacitor 24 is rapidly discharged, and output voltage Ec from DC-to-AC converter 30, is immediately decreased to zero (see FIG. 2H). Since signal DTO is supplied only to drivers 56 and 58, the DC-to-DC converter 30 is not enabled. Therefore, since charging loop Loopl at the converter 30 side is not formed, capacitor 24 can no longer be charged.

During the discharging period, push-pull connected transistors S2 and S3 of DC-to-AC inverter 60 continue switching operations. Thus, loops Loop2 and Loop3 are formed, and a given current continuously flows therethrough. However, as previously described, since DC-to-DC converter 30 completes (stops) its operation, even if DC-to-AC inverter 60 is operated thereafter, high voltage Vt for X-ray tube 92 is generated.

Strictly speaking, DC-to-AC inverter 60 generates an AC voltage by receiving the DC voltage, due to a residual charge stored in capacitor 24. However, this DC voltage is not high enough to generate a required X-ray tube voltage Vt. Since X-rays are not generated from X-ray tube 92, a patient (not shown) will not be unnecessarily irradiated.

It should be noted that the second timer 84 of the inverter controller 80 is controlled to maintain the ON-dwelling time of the last drive pulse $DP_2$ in this embodiment equal to those of the remaining drive pulses $DP_2$, because the switching heat dissipation occurring in the switching transistor $S_2$ must be reduced as much as possible.

In this way, after X-ray irradiation is executed during a time period necessary for X-ray imaging, inverter 60 is operated as necessary for discharging residual voltage Ec stored in capacitor 24 of converter 30. Thus, the residual charge in capacitor 24 can be rapidly and completely discharged during this period, as indicated by the solid line in FIG. 2H.

When an X-ray irradiation starting command is given for a succeeding X-ray imaging operation to begin, there is no fear of an abnormally high voltage generated from DC-to-AC inverter 60.

The time period necessary for discharging a residual charge stored in capacitor 24 is very short (e.g., about 10 msec or lower) as compared with that for natural discharging. Therefore, with the system of the present invention, even if X-ray irradiation is repetitively performed over a short time period, a desired tube voltage can be stably applied. As a result, a better quality X-ray image can be obtained, and damage to the X-ray tube due to excess tube voltages can be avoided.

ANOTHER HV POWER SUPPLY SYSTEM

Another high voltage power supply system 100 of the present invention will now be described with reference to FIGS. 3A to 3C.

Figure 3A:
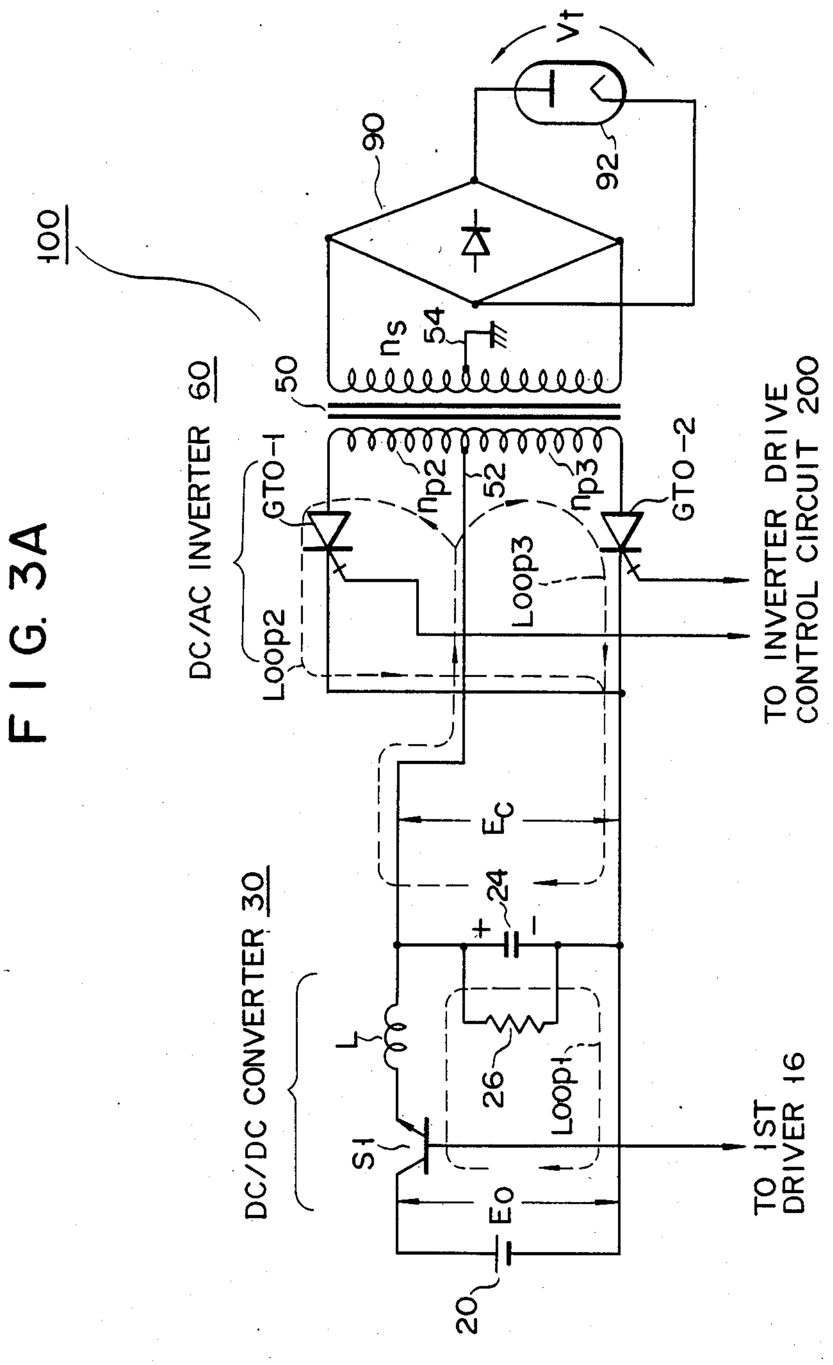
FIG. 3A is a circuit diagram of another embodiment according to the invention.

As is apparent from FIG. 3A, the circuit of this embodiment is substantially the same as that in FIG. 1. Only differences therebetween need be explained.

Gate-turn-off thyristors GTO-1 and GTO-2 are used as a switching element of DC-to-AC inverter 60. Gate pulses (to be described later) are supplied to cause these thyristors to also be alternately and repeatedly turned on and off, thus preventing simultaneous ON/OFF operations thereof.

Figure 3B:
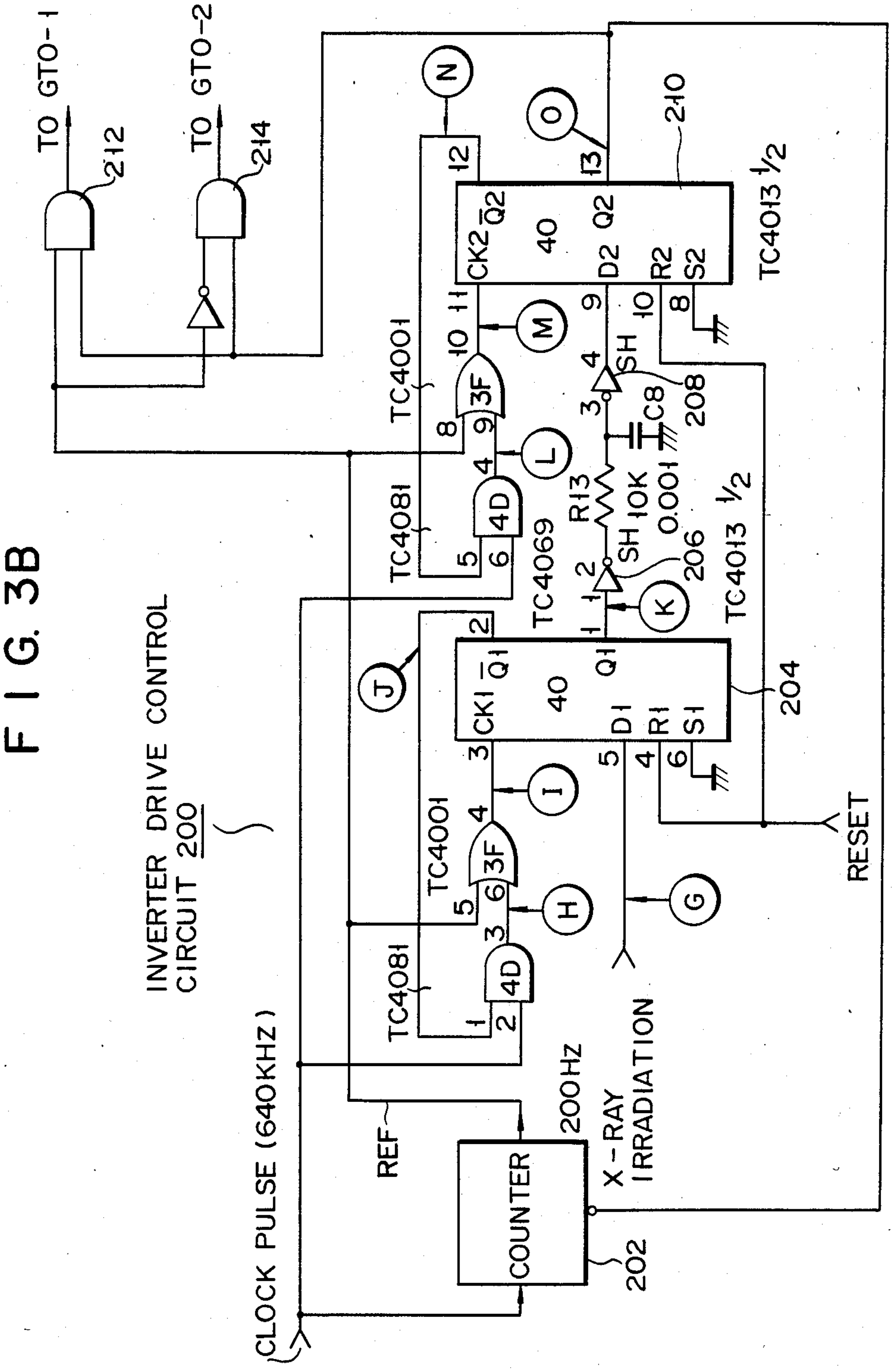
FIG. 3B is a circuit diagram of the invention drive control circuit employed in the circuit shown in FIG. 3A.

FIG. 3B shows a circuit for generating such gate pulses. Inverter drive control circuit 200 is operated by clock pulses at a frequency of 640 KHz. The clock pulses are counted down by counter 202, thus obtaining a reference signal having a frequency of 200 Hz.

An X-ray irradiation time set signal is latched by the first stage of D type flip-flop 204, and the Q1 output therefrom (indicated by symbol (K)) is delayed by two-staged threshold circuits 206 and 208. The delayed signal is latched by the second stage of D type flip-flop 210, and the Q2 output therefrom (indicated by symbol (O)) is supplied to the input gates of AND gates 212 and 214. AND gates 212 and 214 receive reference pulse REF as an output from counter 202 at the other input gates thereof. However, in this embodiment, in order to alternately turn on and off thyristors GTO-1 and GTO-2 as described above, inverter 216 is connected to the other input gate of AND gate 214 (see FIGS. 3B and 3C).

Figure 3C:
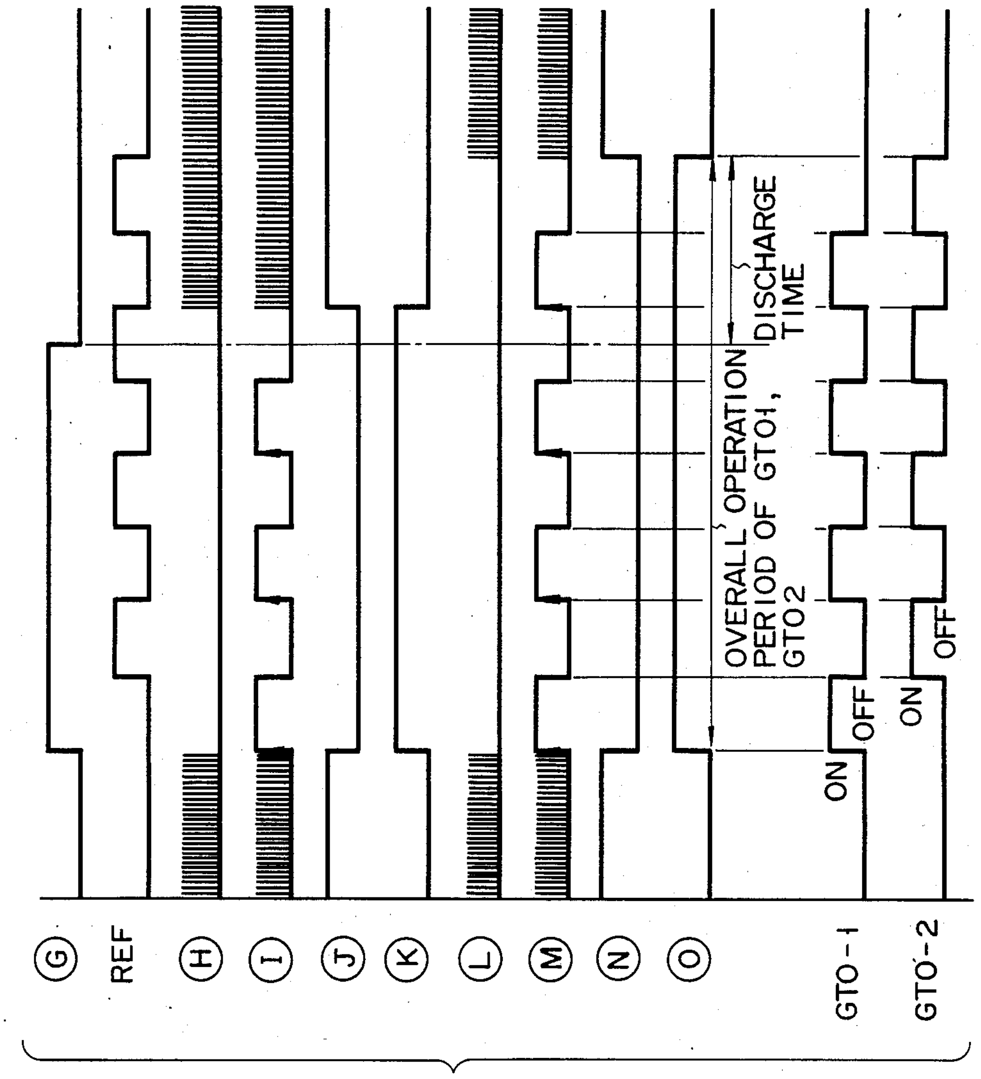
FIG. 3C shows a waveform chart of the circuit shown in FIG. 3A.

For the sake of easy understanding of the above operation, FIG. 3C illustrates waveforms at the respective circuit portions indicated by symbols (G) to (O) in FIG. 3A.

"SG1000R22" (rated: 1,000 A, 1,200 V, available from TOSHIBA) is adopted as thyristors GTO-1 and GTO-2 FIG. 3A, and three "2SD1034A" (TOSHIBA) as transistor S1 of converter 30 are connected in parallel to obtain a rated capacitance of 300 A and 450 V.

According to the present invention as described above, a high voltage power supply system can be provided characterized in that a desired tube voltage can be stably applied during X-ray irradiation within a predetermined time period, and a better X-ray image quality can be obtained. In addition, when an X-ray imaging operation is repetitively performed within a short period, damage to an X-ray tube due to the excess high voltages can be prevented.

What is claimed is:

1. A high voltage power supply system comprising:
- means for producing a command signal to determine a time period of X-ray irradiation;
- a DC-to-DC converter circuit including first switching means for switching a DC (direct current) input voltage so as to produce a DC low output voltage in response to said command signal during only said time period of X-ray irradiation, and filtering means having at least a capacitive element for filtering said DC low output voltage to produce a filtered DC low output voltage;
- a DC-to-AC inverter circuit including second switching means connected to said DC-to-DC converter circuit, for switching said filtered DC low output voltage so as to produce an AC (alternating current) low voltage, and a step-up transformer having a primary winding and a secondary winding magnetically coupled to said primary winding, said primary winding being connected to said second switching means so as to receive said AC low voltage and said secondary winding including an AC high voltage for the X-ray irradiation by transforming said AC low voltage applied to said primary winding; and
- an inverter control circuit coupled to said second switching means of the DC-to-AC inverter circuit, for controlling, in response to said command signal, an operation time period of said DC-to-AC inverter circuit to be longer than said time period of X-ray radiation so as to discharge a residual charge stored in said capacitive element of said filtering means.

2. A system as claimed in claim 1, wherein said converter control circuit includes:
- a timer for delaying said command signal to produce a timer output signal, the duration time of which covers a time period to complete the discharge of said residual charge stored in said capacitive element; and
- an OR gate for OR-gating said command signal and said timer output signal so as to pass both said command and timer output signals to said second switching means of the DC-to-AC inverter circuit.

3. A system as claimed in claim 1, wherein said filtering means of the DC-to-DC converter circuit includes:
- a capacitor as said capacitive element, and
- a resistor connected in parallel with the capacitor for partially discharging said residual charge stored in capacitor after the time period of X-ray irradiation.

4. A system as claimed in claim 1, wherein said first switching means is a transistor.

5. A system as claimed in claim 4, further comprising a first driver circuit for producing, in response to said command signal, a first drive signal by pulse-width-modulating said command signal, said pulse-width-modulated drive signal being supplied to said transistor to control an amplitude of said DC low output voltage.

6. A system as claimed in claim 1, wherein said second switching means is constructed by second and third transistors that are push-pull-connected, and said primary winding of the step-up transformer has a center tap to which said second and third transistors are connected so as to establish two close circuit loops.

7. A system as claimed in claim 6, further comprising second and third driver circuits for producing complementary drive pulses to drive said push-pull-connected second and third transistors.

8. A system as claimed in claim 1, wherein
- said second switching means is constructed by first and second gate-turn-off thyristors that are push-pull-connected;
- said primary winding of the step-up transformer has a center tap to which said first and second gate-turn-off thyristors are connected so as to establish two close circuit loops; and
- an inverter drive control circuit is connected to said first and second gate-turn-off thyristors to drive the same by complementary drive pulses.

* * * * *